March 8, 1938.  L. J. CARNS ET AL  2,110,323
FOUNTAIN COMB
Filed May 18, 1937
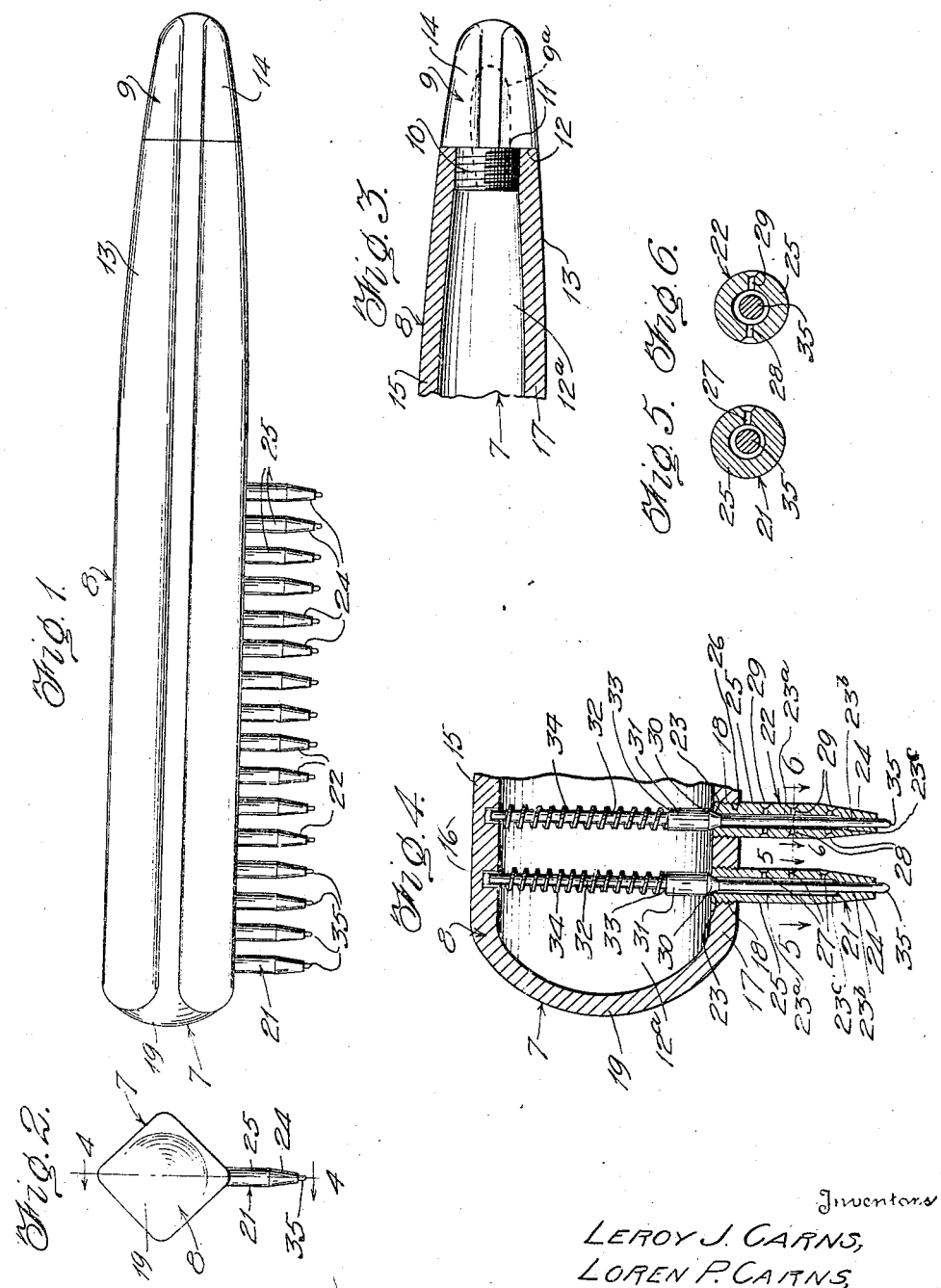
Inventors
LEROY J. CARNS,
LOREN P. CARNS,
By Kimmel & Crowell
Attorneys.

Patented Mar. 8, 1938

2,110,323

UNITED STATES PATENT OFFICE 2,110,323

FOUNTAIN COMB

Leroy J. Carns and Loren P. Carns, Coffeyville, Kans.

Application May 18, 1937, Serial No. 143,354

13 Claims. (Cl. 132—13)

This invention relates to a fountain comb designed primarily for oiling the hair, yet it is to be understood that it is for employment in any connection for which it may be found applicable and the invention has for its object to provide, in a manner as hereinafter set forth, a comb of the class referred to so constructed and arranged as to provide for distributing oil evenly through the hair when drawn through the latter.

Further objects of the invention are to provide, in a manner as hereinafter set forth, a fountain comb which is simple in its construction and arrangement, strong, durable, compact, readily assembled, thoroughly efficient when used, conveniently filled with the oil which is to be distributed thereby, normally in a non-distributing state, placed in a distributing state by the application of pressure thereto, providing when in a distributing state for the passage of the oil, at a plurality of points laterally from each of the tines thereof, quickly repaired when occasion requires and comparatively inexpensive to manufacture.

To the above ends essentially and to others which may hereinafter appear, the invention consists of the novel construction, combination and arrangement of parts as will be more specifically referred to and as illustrated in the accompanying drawing wherein is shown an embodiment of the invention, but it is to be understood that changes, variations and modifications may be resorted to which fall within the scope of the invention as claimed.

In the drawing:

Figure 1 is a side elevation of the comb,

Figure 2 is a view looking towards its outer end,

Figure 3 is a fragmentary view partly in elevation and partly in lengthwise section of the inner end terminal portion of the combined reservoir and handle forming element, Figure 4 is a fragmentary view in vertical section of the outer portion of the comb, Figure 5 is a section on line 5—5, Figure 4, and Figure 6 is a section on line 6—6, Figure 4 illustrating the form of tines employed other than the form of the outer tine of the series as shown in Figure 4.

Referring to the drawing the comb includes a combined oil reservoir forming and handle element 7 of polygonal contour in vertical section. The element 7 is formed of a pair of sections 8, 9. The section 8 is hollow, closed at its outer end, open at its inner end and has its inner face at its inner end threaded for engagement by a peripherally threaded plug 10 forming a part of the section 9. The latter is recessed as at 9a and of materially less length than that of section 8. The plug 10 is formed by reducing a portion of section 9 whereby the latter is formed intermediate its ends with a shoulder 11 which abuts the inner end edge 12 of section 8. The section 9 not only provides a closure for the open end of section 8, but also a continuation of the latter. The section 8 provides an oil reservoir 12a. The section 8 has a tapered part 13 which forms the major portion of the handle of the comb. The remaining portion of the handle is provided by that part 14 of section 9 arranged exteriorly of section 8. The part 14 forms a tapered continuation of part 13.

The inner face of the top wall 15 of reservoir 12, at the longitudinal median of said wall is formed with a series of closely arranged sockets 16 which open into reservoir 12. The inner face of the bottom wall 17 of reservoir 12, at the longitudinal median of such wall is formed with a series of closely arranged screw threaded openings 18 which align with and are of greater diameter than that of the sockets 16. The sockets 16 and openings 18 are positioned between the outer end wall 19 of reservoir 12 and the tapered part 13 of section 8.

The comb includes a row of tubular spaced parallel tines corresponding in number to the number of sockets and openings and each opening at each of its ends. One of the tines is arranged in proximity to the end wall 19 and is indicated at 21. The other tines of the row are indicated at 22. Each of the tines of said row has the upper end portion of its inner face inversely tapered to provide a valve seat 23. The inner face of each of the tines of the row is upon two different diameters, as indicated at 23a, 23b. The junction of the two diameters provides the tine with an internal shoulder 23c. The portion 23a is of greater length than portion 23b and extends from valve seat 23 to shoulder 23c. The outer diameter of the outer end terminal portion 24 of each of the tines of the row gradually decreases in diameter to the outer end thereof and the remaining portion 25 of each tine is of uniform outer diameter. The inner end portion of the outer face of each of the tines of the row is formed with peripheral threads 26 for coaction with a threaded opening 18 for detachably connecting the tine to the wall 17. The inner or upper ends of the tines are flush with the inner face of wall 17. The tine 21 is formed intermediate its ends and in one side only with a set of superposed spaced laterally disposed ports 27 extending from its inner to its outer face. Each of the tines 22 is formed intermediate its ends in opposed sides with two oppositely extending spaced sets of superposed spaced laterally disposed ports and with the ports of one set indicated at 28 and those of the other set at 29. The inner ends of the ports 28 align with the inner ends of the ports 29. The ports 28, 29 extend from the inner to the outer face of the tines 22. That tine 22 which opposes tine 21 has the outer ends of the upper ports 28 therein align with the outer ends of the upper ports 27 in the tine 21. The outer port 28 in the said tine 22 is arranged slightly below the outer port 27 in tine 21. The outer one of the ports 28, 29 in each tine 22 is downwardly inclined and the other ports 28, 29 are straight. The outer ends of the ports 27, 28 and 29 are enlarged to facilitate discharge. The ports 27 are straight. The shoulders 23c are arranged outwardly of the outermost ports 27, 28 and 29 and function to interrupt the flow of oil through the tines resulting in the backing up of the oil providing for satisfactory discharge of the oil laterally.

Normally engaging each of the seats 23 is the inverted frustro-tapered outer end 30 of a spring controlled shut-off valve 31 which has integral with its inner end a stem 32 aligning with a socket 16. The valve stem 32 is of reduced diameter with respect to the inner end of valve 31 whereby said inner end forms a shoulder 33. The stems extend into the sockets 16. Surrounding each stem 32 and abutting the inner face of wall 15 and a shoulder 33, is a coiled controlling spring 34 for the valve. Integral with the outer end of the valve 31 is a lifting rod 35 therefor. The rods 35 are arranged within and are of a length to normally extend from the outer ends of the tines when the valves are held on their seats by the springs 34. The rods are lifted by the application of pressure on their lower or outer ends and when lifted overcome the pressure of the springs 34 whereby the stems 32 are moved upwardly in the sockets 16 to engage the bases of the latter for limiting the extent of the opening movement applied to the valves 31.

When drawing the comb through the hair and applying pressure in a direction towards the scalp, the rods 35 will be shifted inwardly against the action of springs 34 unseating the valves and permitting of the oil discharging laterally from the tines, as well as from the outer ends of the latter. The oil will be discharged laterally from opposed sides of the tines 22 and laterally from one side of the tine 21. The discharge of the oil in the manner as aforesaid will distribute the oil evenly through the hair.

It is to be understood that the comb may be of any length and width, as well as set up with any desirable number of tines.

What we claim is:

1. A fountain comb comprising a combined oil reservoir and handle element, said reservoir including a top wall formed with inwardly opening spaced sockets and a bottom wall having spaced threaded openings aligning with the sockets, tubular oil distributing tines having their inner terminal portions positioned in and threadedly engaging with the walls of said openings, said tines being extended outwardly from said openings, open at their ends, formed intermediate their ends with laterally disposed spaced superposed outlet ports and provided at the inner ends of their inner faces with valve seats, valves coacting with said seats and including spring controlled stems at their inner ends and pressure shiftable rods at their outer ends, said stems arranged in said reservoir and aligning with said sockets and said rods extending through said tines, each of said tines having its inner face so formed to provide an interrupter outwardly adjacent said ports, and controlling springs encompassing said stems and interposed between said top wall and valves for normally maintaining the valves seated and the rods in extended relation to the outer ends of the tines.

2. The invention as set forth in claim 1 having said element formed of a pair of interengaging sections, one of said sections being hollow, closed at its outer end, open at its inner section and providing the reservoir, the other of said sections being solid and including a plug extended into the open end of the hollow section to provide for the solid section abutting and closing said inner end.

3. The invention as set forth in claim 1 having each of said tines formed at one side with a set of superposed spaced laterally disposed ports extending from the inner to the outer face of the tine.

4. The invention as set forth in claim 1 having each of said tines formed at one side with a set of superposed spaced laterally disposed ports extending from the inner to the outer face of the tine and having enlarged outer terminal portions.

5. The invention as set forth in claim 1 having said tines, with the exception of one, formed in opposed sides with sets of superposed spaced laterally disposed ports extending from the inner to the outer face thereof, and the said one tine being formed in one side with a set of superposed spaced laterally disposed ports extending from its inner to its outer face.

6. The invention as set forth in claim 1 having said tines, with the exception of one, formed in opposed sides with sets of superposed spaced laterally disposed ports extending from the inner to the outer face thereof, the inner ends of the ports of one set in a tine aligning with the inner ends of the ports of the other set in the tine.

7. A fountain comb comprising a combined oil reservoir and handle element, said reservoir including top and bottom walls, said top wall having its inner face formed with spaced sockets, said bottom wall having its inner face formed with spaced screw-threaded openings aligning with said sockets, tubular oil distributing tines, open at each end, having their inner ends secured in said openings, flush with the said bottom wall and opening at their inner ends into the reservoir, said tines being formed intermediate their ends with laterally disposed outlet ports and at the inner ends of their inner faces with valve seats, valves including stems at their inner ends and pressure shifted lift rods therefor at their outer ends, said stems arranged in the reservoir and extending into said sockets, said rods arranged in said tines, and controlling springs encompassing said stems and abutting the inner ends of the valves and the said top wall for normally maintaining the valves against said seats and the rods in extended relation with respect to the outer ends of said tines, said ports being arranged in sets, the ports of each set being disposed in superposed spaced relation and extending from the inner to the outer faces of the tines.

8. A fountain comb comprising a combined oil reservoir and handle element, said reservoir including top and bottom walls, said top wall having its inner face formed with spaced sockets, said bottom wall having its inner face formed with spaced screw-threaded openings aligning with said sockets, tubular oil distributing tines having their inner end terminal portions secured in said openings, said tines being formed intermediate their ends with laterally disposed outlet ports and at their inner ends with internal valve seats, valves including stems at their inner ends and pressure shifted lift rods therefor at their outer ends, said stems arranged in the reservoir and extending into said sockets, said rods arranged in said tines, and controlling springs encompassing said stems and abutting the inner ends of the valves and the said top wall for normally maintaining the valves against said seats and the rods in extended relation with respect to the outer ends of said tines, said ports being arranged in sets, the ports of each set being disposed in superposed spaced relation and extending from the inner to the outer faces of the tines, each of said tines being formed with an interrupter internally thereof outwardly adjacent the ports therein, said rods being of materially less diameter than the inner diameter of said tines, and that portion of the tines extending from the interrupter to the inner ends of the tines, with the exception of one being formed with a pair of oppositely extending sets of ports.

9. In a fountain comb, tubular tines for feeding a fluid when the comb is used, each of said tines open at each end, the inner face of each tine being of two different diameters to provide the body with portions of different thicknesses and an interrupter at the junction of the two diameters, the portion of the tine body of smallest thickness being of greater length than the portion of greatest thickness and being formed on its inner face at its inner end with a valve seat, the said portion of smallest thickness being provided in one side with a plurality of spaced laterally extending superposed ports opening at their inner and outer ends respectively at the inner and outer peripheries of such portion.

10. In a fountain comb, tubular tines for feeding a fluid when the comb is used, each of said tines open at each end, the inner face of each tine being of two different diameters to provide the body with portions of different thicknesses and an interrupter at the junction of the two diameters, the portion of the tine body of smallest thickness being of greater length than the portion of greatest thickness and being formed on its inner face at its inner end with a valve seat, the said portion of smallest thickness having opposed sides thereof, each provided with a plurality of spaced superposed laterally extending ports opening at their inner and outer ends respectively at the inner and outer peripheries of such portion.

11. In a fountain comb, tubular tines for feeding a fluid when the comb is used, each of said tines open at each end, the inner face of each tine being of two different diameters to provide the body with portions of different thicknesses and an interrupter at the junction of the two diameters, the portion of the tine body of smallest thickness being of greater length than the portion of greatest thickness and being formed on its inner face at its inner end with a valve seat, the said portion of smallest thickness having opposed sides thereof, each provided with a plurality of spaced superposed laterally extending ports opening at their inner and outer ends respectively at the inner and outer peripheries of such portion, the inner ends of the ports in one side of the portion of smallest thickness align with the inner ends of the ports in the other side of such portion.

12. In a fountain comb, tubular tines for feeding a fluid when the comb is used, each of said tines open at each end, the inner face of each tine being of two different diameters to provide the body with portions of different thicknesses and an interrupter at the junction of the two diameters, the portion of the tine body of smallest thickness being of greater length than the portion of greatest thickness and being formed on its inner face at its inner end with a valve seat, the said portion of smallest thickness being provided in one side with a plurality of spaced laterally extending superposed ports opening at their inner and outer ends respectively at the inner and outer peripheries of such portion, the outer ends of said ports being enlarged.

13. In a fountain comb, tubular tines for feeding a fluid when the comb is used, each of said tines open at each end, the inner face of each tine being of two different diameters to provide the body with portions of different thicknesses and an interrupter at the junction of the two diameters, the portion of the tine body of smallest thickness being of greater length than the portion of greatest thickness and being formed on its inner face at its inner end with a valve seat, the said portion of smallest thickness having opposed sides thereof, each provided with a plurality of spaced superposed laterally extending ports opening at their inner and outer ends respectively at the inner and outer peripheries of such portion, the outer ends of said ports being enlarged.

LEROY J. CARNS.
LOREN P. CARNS.